(12) United States Patent
Zetterberg et al.

(10) Patent No.: US 10,517,009 B2
(45) Date of Patent: Dec. 24, 2019

(54) NETWORK, NETWORK NODE, USER EQUIPMENT AND METHOD THEREIN FOR ESTABLISHING ACTIVE MODE BEAM TO IDLE MODE CELLS NEIGHBOUR RELATIONS IN A WIRELESS COMMUNICATION NETWORK

(71) Applicant: Telefonaktiebolaget LM Ericsson (publ), Stockholm (SE)

(72) Inventors: Kristina Zetterberg, Linköping (SE); Icaro L. J. da Silva, Solna (SE); Fredrik Gunnarsson, Linköping (SE); Reza Moosavi, Linköping (SE); Pradeepa Ramachandra, Linköping (SE); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/558,381

(22) PCT Filed: Aug. 3, 2017

(86) PCT No.: PCT/SE2017/050800
§ 371 (c)(1),
(2) Date: Sep. 14, 2017

(87) PCT Pub. No.: WO2018/063051
PCT Pub. Date: Apr. 5, 2018

(65) Prior Publication Data
US 2019/0045384 A1    Feb. 7, 2019

Related U.S. Application Data

(60) Provisional application No. 62/402,032, filed on Sep. 30, 2016.

(51) Int. Cl.
*H04L 12/26* (2006.01)
*H04W 24/10* (2009.01)
(Continued)

(52) U.S. Cl.
CPC ........... *H04W 24/10* (2013.01); *H04W 24/02* (2013.01); *H04W 36/0083* (2013.01); *H04W 56/001* (2013.01)

(58) Field of Classification Search
CPC ..... H04W 24/08; H04W 24/10; H04W 88/08; H04W 24/02; H04W 88/02
See application file for complete search history.

(56) References Cited

U.S. PATENT DOCUMENTS

2009/0298502 A1    12/2009 Hagerman
2010/0195627 A1*    8/2010 Sundarraman .... H04W 56/0055
370/336
(Continued)

OTHER PUBLICATIONS

Unknown, Author, 3GPP TSG-RAN WG2 Meeting #95bis, R2-166927, Kaohsiung, Taiwan, Oct. 10-14, 2016, 1-4.
(Continued)

*Primary Examiner* — Atique Ahmed
(74) *Attorney, Agent, or Firm* — Murphy, Bilak & Homiller, PLLC

(57) ABSTRACT

Method and apparatus in a wireless communication network (100) for establishing active mode beam to idle mode cells neighbour relations are disclosed. A first network node (111) and other network nodes, a second and a third network nodes (112, 113) operate in the wireless communication network (100). The first network node (111) is a serving network node for the user equipment (130) with the active mode beam, and the idle mode cells are synchronization signal broadcast areas provided by the other network nodes (112, 113). The first network node (111) obtains information on synchronization signals transmitted from the other network
(Continued)

nodes and stores information on active mode beam to idle mode cell relations, wherein the active mode beam is the beam serving the user equipment (130) when a new synchronization signal is detected, and the idle mode cell is the cell with the synchronization signal broadcast area provided by the network node transmitting the detected synchronization signal.

22 Claims, 12 Drawing Sheets

(51) Int. Cl.
*H04W 24/02* (2009.01)
*H04W 56/00* (2009.01)
*H04W 36/00* (2009.01)

(56) References Cited

U.S. PATENT DOCUMENTS

| | | | |
|---|---|---|---|
| 2010/0316000 A1 | 12/2010 | Burbidge et al. | |
| 2011/0158164 A1* | 6/2011 | Palanki | H04W 56/0015 370/328 |
| 2012/0004009 A1* | 1/2012 | Lindoff | H04W 52/0232 455/522 |
| 2012/0094661 A1* | 4/2012 | Frenger | H04W 52/343 455/434 |
| 2014/0086173 A1* | 3/2014 | Sadeghi | H04L 5/005 370/329 |
| 2014/0301337 A1 | 10/2014 | Hapsari et al. | |
| 2015/0173004 A1 | 6/2015 | Nigam et al. | |
| 2015/0208269 A1* | 7/2015 | Damnjanovic | H04L 1/0026 370/252 |
| 2015/0223284 A1 | 8/2015 | Jain et al. | |
| 2015/0319701 A1* | 11/2015 | Ng | H04L 5/005 370/311 |
| 2015/0326282 A1 | 11/2015 | Futaki | |
| 2016/0037425 A1 | 2/2016 | Van Lieshout et al. | |
| 2016/0057719 A1* | 2/2016 | Centonza | H04L 7/08 370/350 |
| 2016/0066255 A1* | 3/2016 | Marinier | H04W 48/16 370/350 |
| 2016/0088579 A1* | 3/2016 | Harada | H04W 48/10 370/336 |
| 2016/0353347 A1 | 12/2016 | Jun et al. | |
| 2017/0034812 A1 | 2/2017 | Deng et al. | |
| 2017/0359791 A1* | 12/2017 | Onggosanusi | H04L 27/2613 |
| 2018/0049080 A1* | 2/2018 | Zhang | H04W 4/70 |
| 2019/0075526 A1 | 3/2019 | Nagaraj et al. | |
| 2019/0089435 A1 | 3/2019 | Mondal et al. | |
| 2019/0104549 A1 | 4/2019 | Deng et al. | |

OTHER PUBLICATIONS

3GPP, "Beam management in NR", 3GPP TSG-RAN WG2 Meeting #95; Agenda Item: 9.5.1.2; ASUSTek, R2-165287; 3rd Generation Partnership Project; XP051126865, http://www.3gpp.org/ftp/Meetings_3GPP_SYNC/RAN2/Docs/., Aug. 21, 2016, pp. 1-4.

3GPP, "Intra NR Mobility (Inter gNBs Mobility)", 3GPP TSG RAN WG3 meeting #93; R3-161705; 3rd Generation Partnership Project (3GPP), Agenda Item 10.4.1; XP051134877, http://www.3gpp.org/ftp/tsg_ran/WG3_lujTSGR3 93/Docs/Section 2.1, Aug. 22, 2016-Aug. 28, 2016, pp. 1-5.

Prados-Garzon, Jonathan, et al., "Handover Implementation in a 5G SDN-based Mobile Network Architecture", 2016 IEEE 27th Annual IEEE International Symposium on Personal, Indoor and Mobile Radio Communications. (PIMRC): Mobile and Wireless Networks; XP033035568,, Sep. 4, 2016, pp. 1-6.

Ramachandra, Pradeepa et al., "On Automatic Establishment of Relations in 5G Radio Networks", 2016 IEEE 27th Annual International Symposium on Personal, Indoor, and Mobile Radio Communications (PIMRC); Workshop: 6th International Workshop on Self-Organizing Networks (IWSON), Sep. 4, 2016, pp. 1-6.

* cited by examiner

NETWORK, NETWORK NODE, USER EQUIPMENT AND METHOD THEREIN FOR ESTABLISHING ACTIVE MODE BEAM TO IDLE MODE CELLS NEIGHBOUR RELATIONS IN A WIRELESS COMMUNICATION NETWORK

TECHNICAL FIELD

Embodiments herein relate to a network, a network node, a wireless communication device and methods therein. In particular, they relate to establish active mode beam to idle mode cells neighbour relations in a wireless communication network.

BACKGROUND

In a typical wireless communication network, wireless devices, also known as wireless communication devices, mobile stations, stations (STA) and/or user equipment (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless communication device within range of the radio network node.

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network.

3GPP 5G New Radio (NR) is the wireless standard that will become the foundation for the next generation of mobile networks. FIG. 1 depicts an overview of the downlink (DL) based active mode mobility solution proposed for 3GPP 5G NR.

As shown in FIG. 1, a UE is served by the leftmost network node, i.e. the serving node 1, but is traveling in the direction towards the rightmost network node 2, depicted by the dashed arrow in the figure. The UE uses the best "home MRS" (Mobility Reference Signal) for coarse timing estimation and radio link quality monitoring and failure detection, denoted by the dot filled oval in the figure. Alternative names instead of MRS may be Active mode synch signal (AMSS), active mode reference signal or Channel State Information Reference Signal (CSI-RS).

In addition, the UE monitors a sparse periodic MRS from the serving network node 1 and compares it with similar periodic and sparse MRSs from potential target network nodes, e.g. the network node 2. When a target network node becomes relevant for a more detailed handover procedure additional dynamically configured home MRSs from the serving network node 1 and dynamically configured away MRSs from the target network node, e.g. the network node 2, may be activated.

The final handover decision is taken by the network and it is based on UE reports containing measurements of home MRSs and away MRSs.

An example of a proposed system information acquisition for 5G NR is depicted in FIG. 2. In the example each network node, which may also be referred as RBS, eNB, gNB, transmission and reception point (TRP), transmits a synchronization signals or a system signature signal (SS or xSS). Together with the SS each network node also transmits a physical broadcast channel (PBCH) containing some of the minimum system information that the UE need to access the network. This part of the minimum system information is denoted as master information block (MIB) in the figure. The transition of SS and the physical broadcast channel (PBCH) containing the MIB is denoted with dot filled ovals in the figure.

By reading the MIB the UE receives information on how to receive the system information block (SIB) table. The SIB table may be transmitted using a broadcast format such as single frequency network (SFN) transmission and it is depicted with a dashed oval in the figure.

In addition to the minimum system information that is periodically broadcasted by the SS+MIB and in the SIB-table the UE may receive other system information e.g. by a dedicated transmission after initial access is established, depicted with an oval with label "Additional SI transmission" in the figure.

With 5G, the possibility to beamform data transmissions enable a UE to travel far away from its serving network node with a maintained radio quality. This means that the UE could move out of the SS broadcast area, or system area, of the serving network node, but still be connected to the serving network node. An example is shown in FIG. 3.

FIG. 3 depicts a UE served by a data beam, i.e. an active mode beam, from one network node BS1, but with System Information coverage from another network node BS3.

When the UE goes to Idle or inactive or any kind of sleeping state mode, it will find SS3 and camp on BS3. If the UE wants to go back to active mode within a given time window, it is likely that the same beam, the data beam, from BS1 will still be the best beam. However, since the UE can only hear SS3, it will first connect to BS3, and then perform a handover to BS1. When the UE connects to BS3, the UE context will not be known there.

Without knowledge of which active mode beams and which idle mode cells, i.e. network nodes with SS broadcast areas, that are neighbors, these situations will result in degraded performance. For example, a UE may be toggling between active mode and idle mode in a location where active beam and idle mode cell coverage is provided by different network nodes or base stations.

SUMMARY

Therefore it is an object of embodiments herein to provide a technique to establish active mode beam to idle mode cells neighbour relations in a wireless communication network.

According to a first aspect, the object is achieved by a method performed in a user equipment for assisting establishment of active mode beam to idle mode cells neighbour relations in a wireless communication network. A first network node and other network nodes, e.g. a second and a third network nodes operate in the wireless communication network. The first network node is a serving network node for the user equipment with the active mode beam, and the idle mode cells are cells with respective synchronization signal broadcast areas provided by the other network nodes.

The user equipment receives from the first network node, a measurement and report configuration for idle or inactive mode synchronization signal monitoring. The user equipment then initiates idle or inactive mode synchronization signal monitoring and measurement. When the measurements meet a report triggering condition, the user equipment sends an idle or inactive mode synchronization signal measurement report to the first network node.

According to some embodiments, the user equipment provides a capability indication of supporting idle or inactive mode synchronization signal monitoring to a network node.

According to a second aspect, the object is achieved by a method performed in a network node for assisting establishment of active mode beam to idle mode cells neighbour relations in a wireless communication network. A first network node and other network nodes, e.g. a second and a third network nodes operate in the wireless communication network. The first network node is a serving network node for the user equipment with the active mode beam, and the idle mode cells are cells with respective synchronization signal broadcast areas provided by the other network nodes. The network node sends a measurement and report configuration for idle or inactive mode synchronization signal monitoring to the user equipment. The network node receives an idle or inactive mode synchronization signal measurement report from the user equipment.

According some embodiments, the network node may receive a capability indication of supporting idle or inactive mode synchronization signal monitoring from the user equipment.

According to a third aspect, the object is achieved by a method performed in a wireless communication network for establishing active mode beam to idle mode cells neighbour relations. A first network node and other network nodes, e.g. a second and a third network nodes operate in the wireless communication network. The first network node is a serving network node for the user equipment with the active mode beam, and the idle mode cells are cells with respective synchronization signal broadcast areas provided by the other network nodes.

The first network node obtains information on synchronization signals transmitted from the other network nodes.

The first network node stores the information on active mode beam to idle mode cell relations. The active mode beam is the beam serving the user equipment when a new synchronization signal is detected, and the idle mode cell is the cell with a synchronization signal broadcast area provided by the network node transmitting the detected synchronization signal.

The information on active mode beam to idle mode cell relations may comprise some identifier of beams or configurations identifying the beam, which may be a network node or base station internal identifier together with some identifier of the idle mode cell including or giving the possibility to lookup information on how to establish contact i.e. some address, with the Base Station/node providing the idle mode cell.

According to some embodiments, the first network node may obtain information on synchronization signals transmitted from the other network nodes by retrieving the information from a previously stored report.

According to some embodiments, the first network node may send a request on synchronization signal information to all neighboring network nodes. Then the first network node may obtain information on synchronization signals transmitted from the other network nodes by receiving information on synchronization signals transmitted from the other network nodes.

According to some embodiments, the neighboring network nodes known to the first network node may send information on their respective synchronization signals to the first network node.

According to some embodiments, the first network node may send a request to the user equipment to measure the synchronization signals from the other network nodes. The first network node may send a measurement and report configuration for synchronization signal monitoring to the user equipment. The user equipment may send an idle or inactive mode synchronization signal measurement report to the first network node indicating detected synchronization signals. The first network node may obtain information on synchronization signals transmitted from the other network nodes by receiving the information from the user equipment.

According to some embodiments, the measurement and report configuration may comprise reporting its synchronization signal coverage of the other network nodes periodically, e.g. to identify relations between nodes where one network node, e.g. the first network node has an active mode beam coverage in a location which is within an idle mode cell coverage provided by other network node.

According to some embodiments, the measurement and report configuration may comprises reporting its synchronization signal coverage when its synchronization signal coverage of the first network node becomes worse than another synchronization signal coverage more than a certain threshold for a certain time.

According to some embodiments, the measurement and report configuration may comprises adding different offsets to different synchronization signal measurements.

According to some embodiments, the first network node may send a request to the user equipment to monitor and measure the synchronization signals from the other network nodes. The request may comprise a list of known synchronization signals which are known to be used in the idle mode cells that are known neighbors to the active mode beam serving the user equipment.

According to some embodiments, when the user equipment detects a synchronization signal different from the list of known synchronization signals, the user equipment sends an idle or inactive mode synchronization signal measurement report to the first network node indicating the detected synchronization signal. Then, the first network node may obtain information on synchronization signals transmitted from the other network nodes by receiving the information from the user equipment.

According to some embodiments, the first network node may provide transmission gap(s) for the user equipment to measure synchronization signals.

According to some embodiments, the first network node may initiate in a network node or base station relation establishment procedure when the detected synchronization signal is not from one of its neighboring network nodes and set up a neighbour relation to the unknown network node.

By letting the UE measure the SSs from other network nodes while served by a beam in active mode from the serving network node, neighboring idle mode cells can be detected and active mode beam to idle mode cell relations can be established. The active mode beam to idle mode cell relations indicate which active mode beams and idle mode cells that are neighbours.

With the knowledge of which active mode beams and idle mode cells that are neighbours, degraded performance caused by a UE toggling between active and idle mode in a location where active mode beam and idle mode cell coverage provided by different network nodes can be avoided. Furthermore, with such relations available, different procedures may be used to avoid other performance degradation.

BRIEF DESCRIPTION OF THE DRAWINGS

Examples of embodiments herein are described in more detail with reference to attached drawings in which.

DETAILED DESCRIPTION

Please note that the terms "UE", "user equipment" and "wireless device" are used interchangeably in this document.

Figure 1:
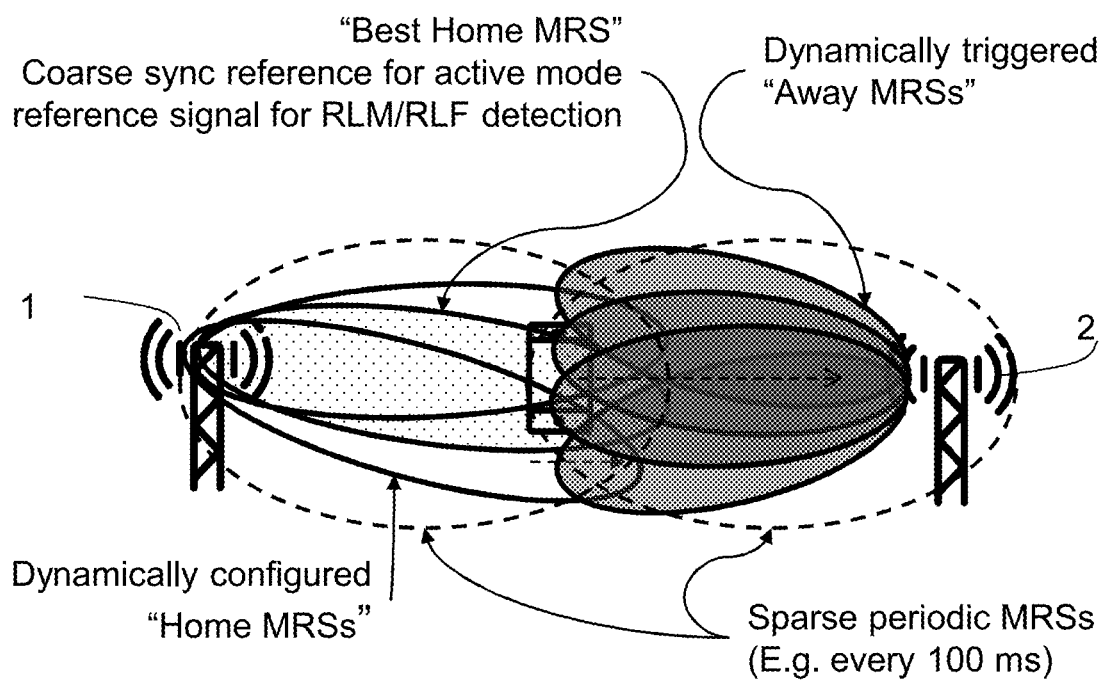
FIG. 1 is a schematic block diagram illustrating an overview of downlink based active mode mobility.
Figure 2:
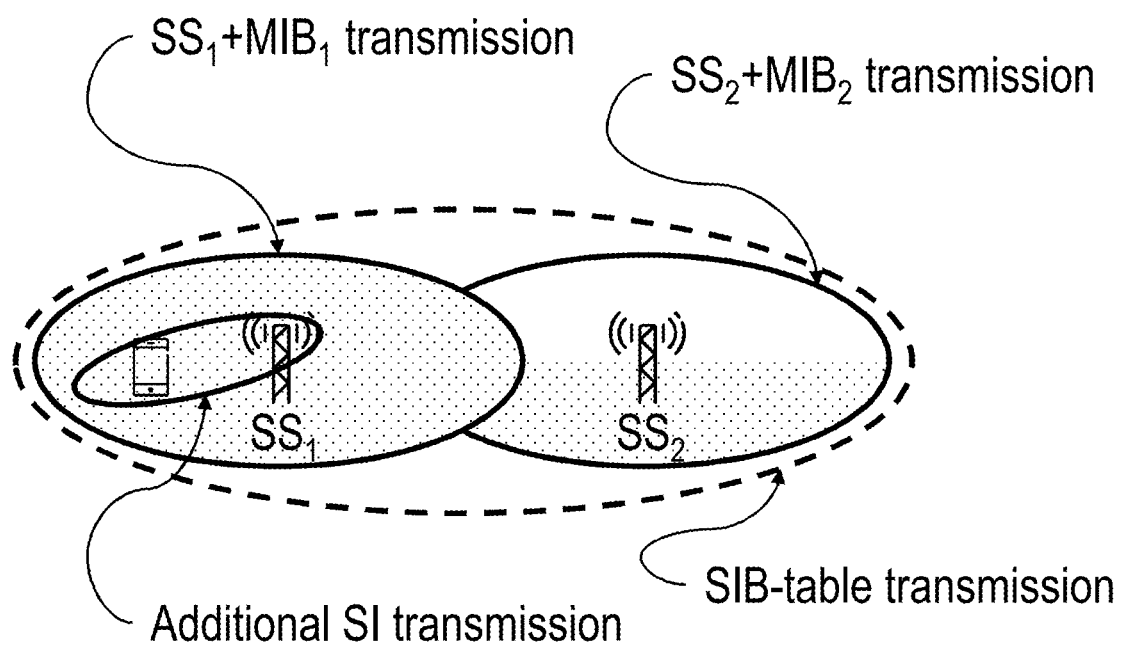
FIG. 2 is a schematic block diagram illustrating an example of system information acquisition.
Figure 3:
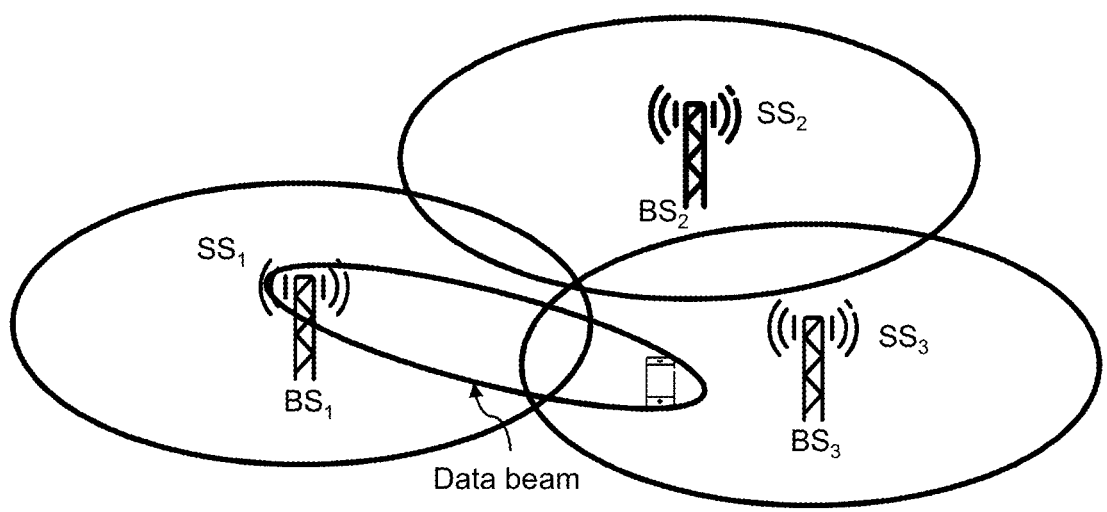
FIG. 3 is a schematic block diagram depicting an example of problems of prior art.
Figure 4:
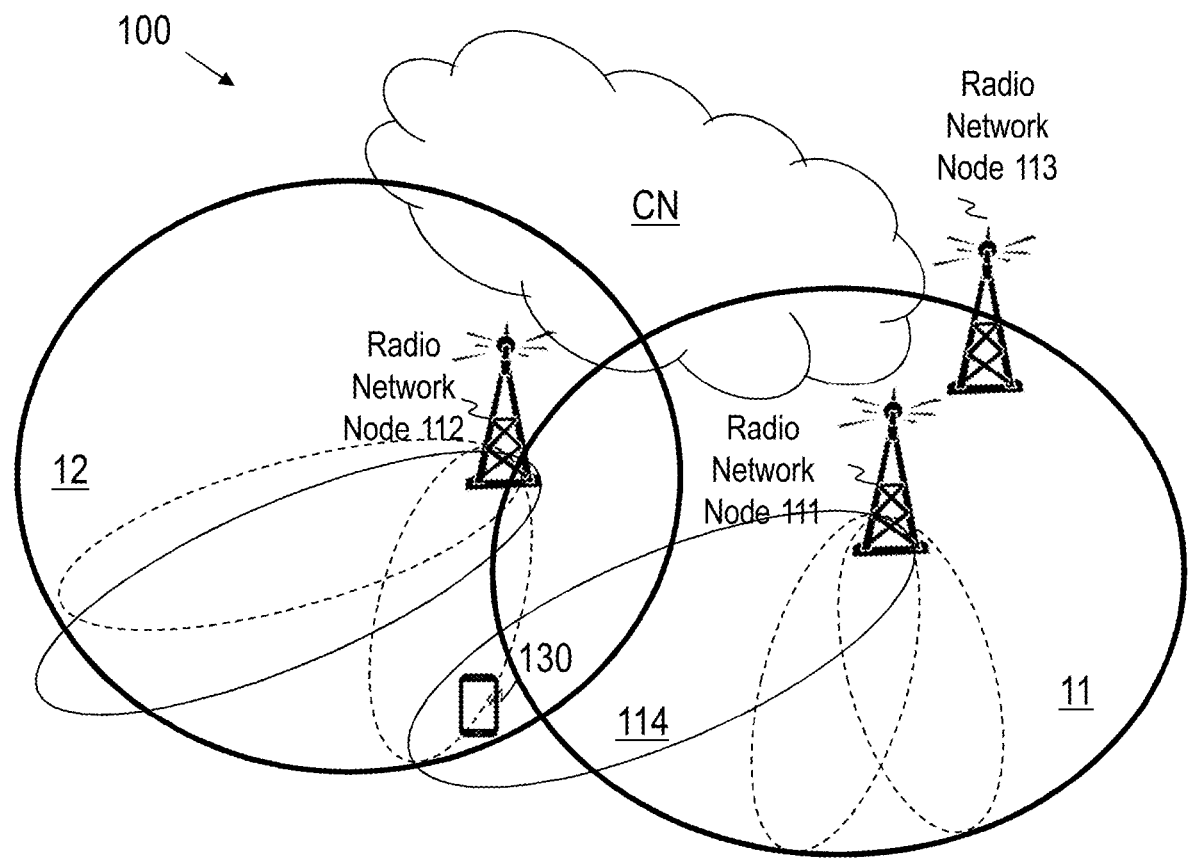
FIG. 4 is a schematic block diagram depicting embodiments of a communication network.

Embodiments herein relate to a communication networks in general. FIG. 4 is a schematic overview depicting a communication network 100. The communication network 100 may be a wireless communications network comprising one or more RANs and one or more CNs. The communication network 100 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, wireless devices e.g. a user equipment 130 such as a mobile station, a non-access point (non-AP) STA, a STA, a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Network nodes operate in the wireless communication network 100 such as a first network node 111 and other network nodes, e.g. a second and third network nodes 112, 113 shown in FIG. 4. The first network node 111 provides radio coverage over a geographical area, a service area 11, which may also be referred to as a SS broadcast area, or system area, or a beam or a beam group where the group of beams is covering the service area of a first radio access technology (RAT), such as 5G, LTE, Wi-Fi or similar. The second network node 112 provides radio coverage over a geographical area, a service area 12, which may also be referred to as a SS broadcast area, or system area, or a beam or a beam group where the group of beams is covering the service area of a first radio access technology (RAT), such as 5G, LTE, Wi-Fi or similar. The third network node 113 also provides radio coverage over a geographical area which is not shown. As shown in FIG. 4, the UE 130 is served by a data beam 114, i.e. an active mode beam, from the first network node 111, but with System Information coverage, i.e. the service area 12, from the second network node 112.

The first and second/third network nodes 111 and 112/113 may be a transmission and reception point e.g. a radio access network node such as a Wireless Local Area Network (WLAN) access point or an Access Point Station (AP STA), an access controller, a base station, e.g. a radio base station such as a NodeB, a gNB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the respective first and second/third network nodes 111 and 112/113 depending e.g. on the radio access technology and terminology used. The first and second/third network nodes 111 and 112/113 may be referred to as a serving radio network node and communicates with the wireless device 130 with Downlink (DL) transmissions to the wireless device 130 and Uplink (UL) transmissions from the wireless device 130.

According to embodiments herein, the serving base station, i.e. the first network node 111, will ask the UE 130 to measure for the idle mode synchronization signal, on demand, periodically, or regularly etc. and to report when detecting an SS change, i.e. detecting that it has moved in to the idle mode cell coverage of another base station than the serving base station. Upon receiving the report, the serving base station may setup a relation between the active mode beam serving the UE and the idle mode cell.

Figure 5:
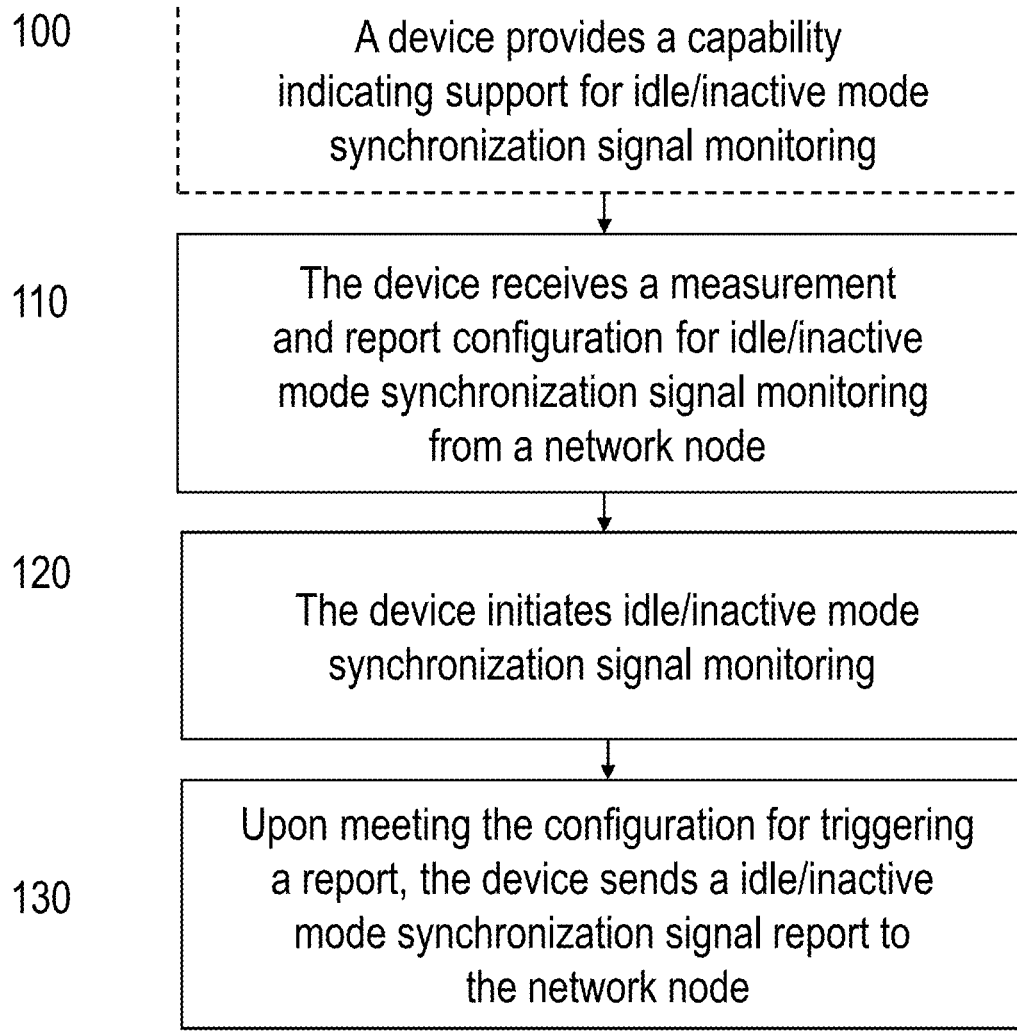
FIG. 5 is a flowchart depicting embodiments of a method performed in a device, e.g. a user equipment.

FIG. 5 provides a flow chart with actions of an example method according to embodiments herein from a device, e.g. UE 130, perspective for assisting establishment of active mode beam to idle mode cells neighbour relations in a wireless communication network 100. As described above, a first network node 111 and other network nodes, e.g. a second and a third network nodes 112, 113 operate in the wireless communication network 100. The first network node 111 is a serving network node for the user equipment 130 with the active mode beam, and the idle mode cells are cells with respective synchronization signals broadcast areas provided by the other network nodes 112, 113. The method comprises following actions, which actions may be performed in any suitable order:

Action 100

The user equipment 130 may optionally provide a capability indication of supporting idle or inactive mode synchronization signal monitoring to a network node. This is to inform the network node of whether the UE is capable of performing the measurements needed so that the network node becomes aware of any possible active mode beam to idle mode cells neighbour relations. The UE 130 may only send an indication if capable of idle or inactive mode synchronization signal monitoring, but may also send a flag "capable" or "not capable" to the network node.

Action 110

In order to know when to start measuring for the idle/inactive mode synchronization signal, or where to measure, or know the conditions for reporting, i.e. periodical or triggered by event, a capable device, i.e. the user equipment 130, receives a measurement and report configuration for idle or inactive mode synchronization signal monitoring from a network node, typically a serving node or base station, e.g. the first network node 111, for idle/inactive mode synchronization signal monitoring.

Action 120

The UE 130 initiates monitoring and measurement of idle or inactive mode synchronization signals according to the measurement and report configuration. This is to be able to detect any idle or inactive mode synchronization signals that meets a triggering condition.

Action 130

When the measurements meet a report triggering condition, e.g. based on demand, periodically or regularly etc. or based on event such as when its SS coverage becomes worse than another SS coverage more than a certain threshold for a certain time, or when detecting an SS change, i.e. detecting that it has moved into the idle mode cell coverage of another network node than the serving network, the UE 130 sends an idle or inactive mode synchronization signal measurement report to the first network node 111. Upon receiving the report, the serving network node 111 may setup a relation between the active mode beam serving the UE 130 and the idle mode cell.

In this way, the UE measures the SSs from other network nodes while served by a beam in active mode from the serving network node, neighboring idle mode cells may be detected and active mode beam to idle mode cell relations can be established. The active mode beam to idle cell relations indicate which active mode beams and idle mode cells that are neighbours.

With the knowledge of which active mode beams and idle mode cells that are neighbours, degraded performance caused by a UE toggling between active and idle mode in a location where active mode beam and idle mode cell coverage provided by different network nodes can be avoided. Furthermore, with such relations available, different procedures may be used to avoid other performance degradation.

Figure 6:
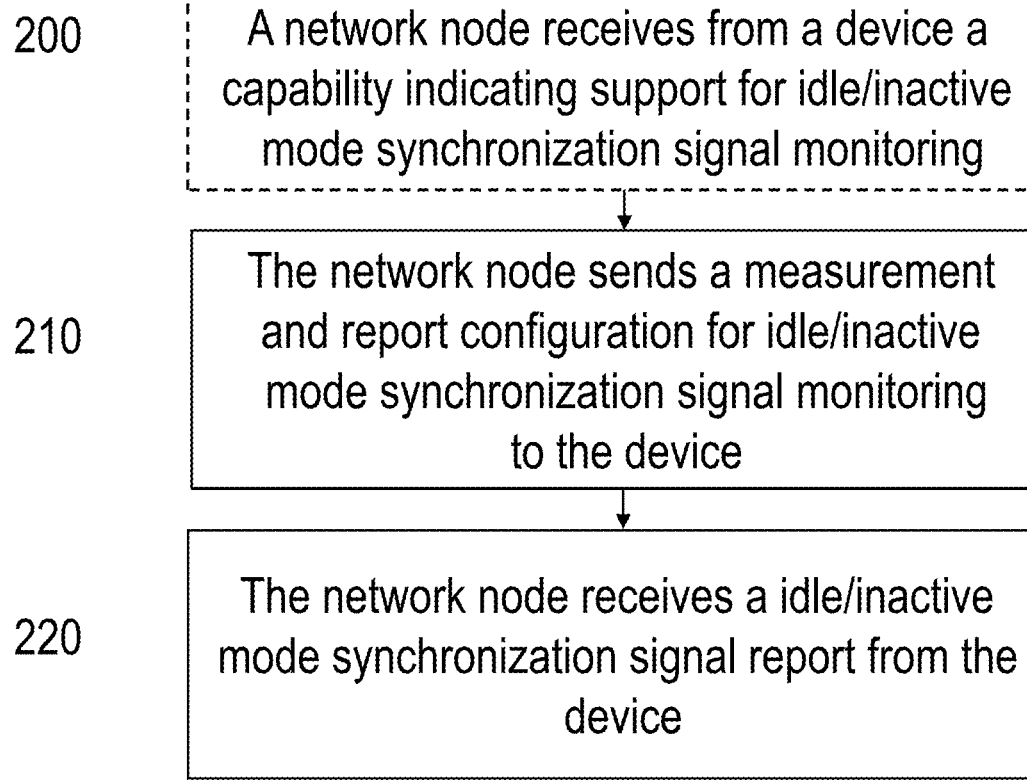
FIG. 6 is a flowchart depicting embodiments of a method performed in a network node.

FIG. 6 illustrates actions of an example method according to embodiments herein from a network node perspective for assisting establishment of active mode beam to idle mode cells neighbour relations in a wireless communication network 100. As described above, a first network node 111 and other network nodes, e.g. a second and a third network nodes 112, 113 operate in the wireless communication network 100. The first network node 111 is a serving network node for the user equipment 130 with the active mode beam, and the idle mode cells are cells with respective synchronization signals broadcast areas provided by the other network nodes 112, 113. The method comprises following actions, which actions may be performed in any suitable order:

Action 200

The network node 111 optionally receives a capability indication of supporting idle or inactive mode synchronization signal monitoring from the UE 130.

Action 210

In order to inform the UE 130 when to start measuring for the idle/inactive mode synchronization signal, or where to measure, or the conditions for reporting, i.e. periodical or triggered by an event, the network node 111 sends to the UE 130 a measurement and report configuration for idle or inactive mode synchronization signal monitoring.

Action 220

When the report triggering conditions have been met, the network node 111 receives an idle or inactive mode synchronization signal measurement report from the UE 130. Upon receiving the report, the network node 111 may setup a relation between the active mode beam serving the UE 130 and the idle mode cell.

Advantage of embodiments herein is that with the knowledge of which active mode beams and idle mode cells, i.e. SS broadcast areas, that are neighbors, degraded performance caused by a UE toggling between active and idle mode in a location with active beam and idle mode cell coverage provided by different base stations can be avoided.

Figure 7:
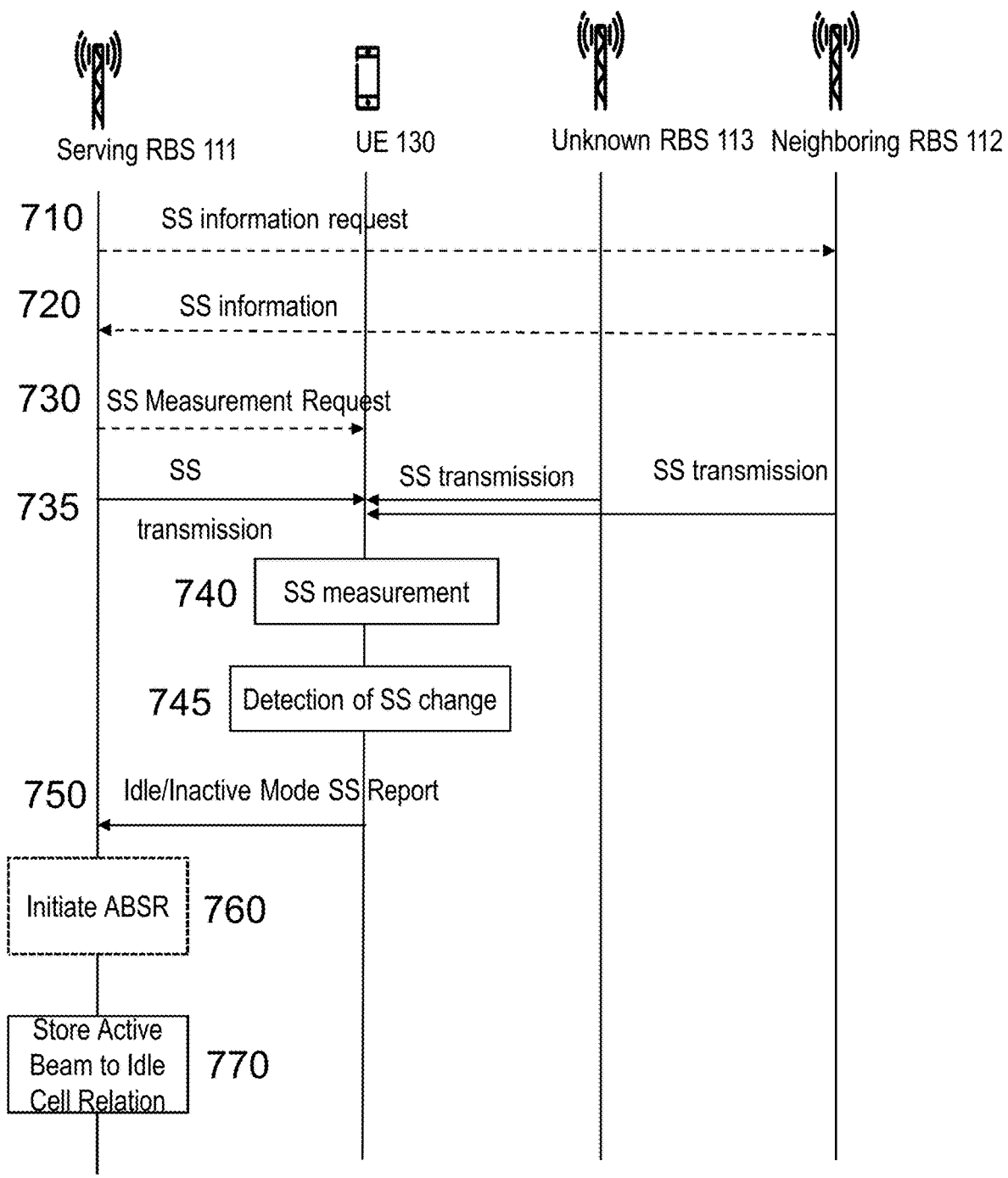
FIG. 7 is a sequence diagram depicting embodiments of a method in a communication network.

An example embodiment is illustrated in a sequence diagram in FIG. 7. The actions or steps of the example embodiment are described below.

In a first, optional step 710, the serving base station, such as the first network node RBS 111, sends a request on SS information to all neighboring base stations such as the network nodes RBS 112, 113

Upon the reception of a SS information request from the serving base station, neighboring base stations send, in step 720, information on the SS they are using to the serving base station.

In an optional step, step 730, the serving base station requests the UE 130 to measure the SSs of the network nodes. With the request, the UE 130 may be configured to report its SS coverage periodically or based on event such as when its SS coverage becomes worse than another SS coverage more than a certain threshold for a certain time. The UE may also be configured to use different offsets added to different SS measurements.

Optionally, the serving base station provides transmission gap(s) to the UE, in which the UE can measure in step 740 for SS transmissions transmitted in step 735.

The UE detects an SS change in step 745.

Based on the configurations mentioned in step 730, the UE sends an idle/inactive mode synchronization signal report to the serving BS 111, indicating measured SSs, in step 750.

If the serving BS 111 do not recognize the detected SS as the SS of one of its neighbors, optionally an automatic base station relation establishment procedure (ABSR) is initiated, in step 760, and a relation to the unknown base station is set up.

The serving base station 111 stores, in step 770, an active beam to idle cell relation between the beam serving the UE 130 at the time of the SS change detection, and the detected idle cell transmitting the SS.

Figure 8:
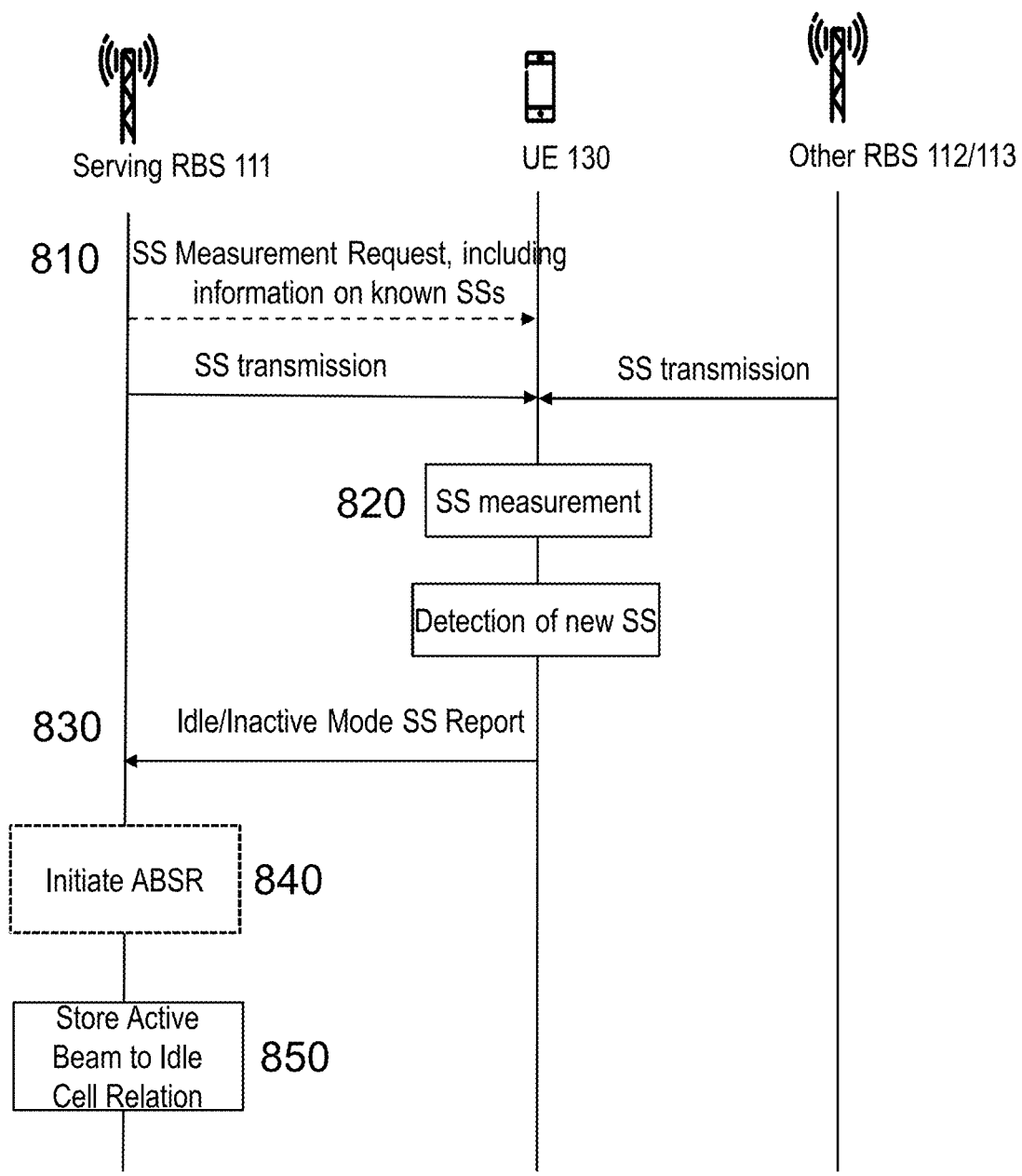
FIG. 8 is a sequence diagram depicting embodiments of a method in a communication network.

A second embodiment of the solution is illustrated in a sequence diagram in FIG. 8. The actions or steps of the embodiment are described below.

In a first, optional step 810, the serving base station 111 may request the UE 130 to monitor the SS of the network node. The request includes information of SSs known to be used in idle mode cells that are known neighbors to the active mode beam serving the UE 130.

The serving base station 111 may provide transmission gap(s) to the UE 130, in which the UE 130 can measure for SS transmissions, e.g. in the case the SS is not transmitted in the same power range as the MRS, in step 820.

If the UE 130 detects a SS different from known information on the serving base station 111 SS, that is not included in the list of known SSs provided in step 810, it sends an Idle/Inactive Mode SS Report to the serving BS, indicating the detected SS, in step 830.

If the serving BS 111 do not recognize the SS as the SS of one of its neighbors, optionally an automatic base station relation establishment procedure (ABSR) is initiated in step 840, and a relation to the unknown base station is set up.

The serving base station 111 stores, in step 850, an active beam to idle cell relation between the beam serving the UE 130 at the time of the new SS detection, and the detected idle cell transmitting the SS.

The actions of the embodiments described herein may of course be combined in various ways into even further embodiments.

In an additional embodiment, the serving base station 111 may inform the other base station 112, 113 with the idle mode cell transmitting the detected SS after storing the active mode beam to idle mode cell relation, and the other base station 112, 113 could set up and store the corresponding idle mode cell to active mode beam relation.

By letting the UE 130 measure the SS while served by a beam in active mode, neighboring idle mode cells can be detected and active mode beam to idle mode cell relations can be established.

Figure 9A:
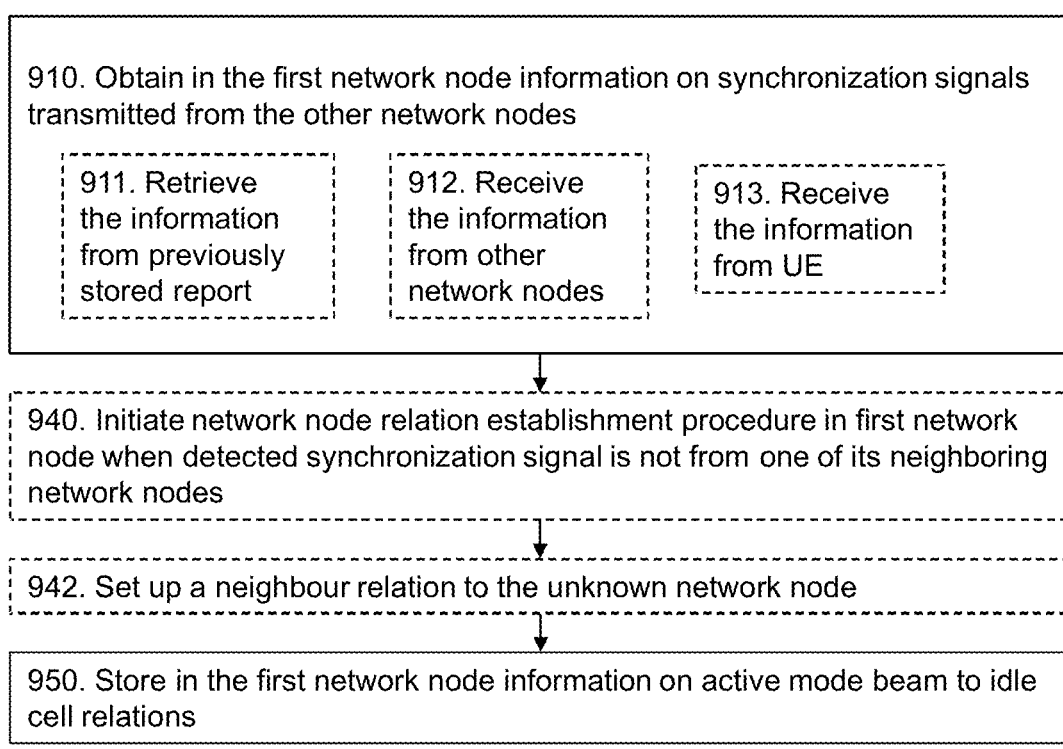
FIGS. 9a and 9b are flowcharts depicting embodiments of a method performed in a communication network.
Figure 9B:
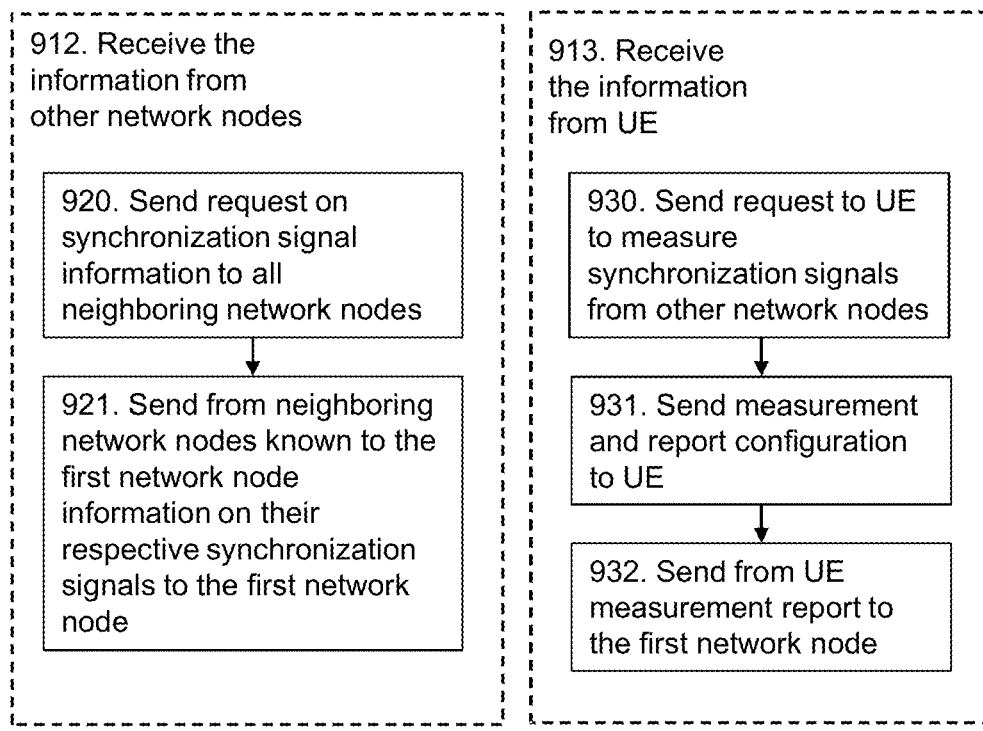

To implement the embodiments of the solutions shown in FIGS. 7 and 8, a method performed in a wireless communication network 100 for establishing active mode beam to idle mode cells neighbour relations will now be described with reference to FIGS. 9a and 9b. As described above, a first network node 111 and other network nodes, e.g. a second and a third network nodes 112, 113 operate in the wireless communication network 100. The first network node 111 is a serving network node for the user equipment 130 with the active mode beam, and the idle mode cells are cells with respective synchronization signal broadcast areas provided by the other network nodes 112, 113. The method comprises following actions, which actions may be performed in any suitable order, the actions shown in dashed-line boxes in FIGS. 9a and 9b are optional:

Action 910

The first network node 111 obtains information on synchronization signals transmitted from other network nodes 112, 113.

There are several ways of obtaining the information on synchronization signals transmitted from other network nodes.

According to some embodiments herein, the first network node 111 may obtain information on synchronization signals transmitted from the other network nodes by retrieving the information from a previously stored report. So, in Action 911 shown in FIG. 9a, the first network node 111 may retrieve the information on synchronization signals from a previously stored report.

According to some embodiments herein, the first network node 111 may obtain information on synchronization signals transmitted from the other network nodes by receiving the information from the other network nodes. So in Action 912 shown in FIG. 9a, the first network node 111 may receive the information from the other network nodes. Then the following actions may be performed with reference to FIG. 9b:

Action 920

The first network node 111 may send a request on synchronization signal information to all neighboring network nodes.

Action 921

According to some embodiments herein, the neighboring network nodes 112, 113 known to the first network node 111 may send information on their respective synchronization signals to the first network node 111.

According to some embodiments herein, the first network node 111 may obtain information on synchronization signals transmitted from the other network nodes by receiving it from the UE 130. So in Action 913 shown in FIG. 9a, the first network node 111 may obtain information on synchronization signals transmitted from the other network nodes by receiving it from UE 130. Thus identifying SS coverages when the UE 130 is served by the active mode beam is needed, and the following actions may be performed with reference to FIG. 9b:

Action 930

The first network node 111 may send a request to the user equipment 130 to measure the synchronization signals from the other network nodes.

According to some embodiments herein, the request may comprise a list of known synchronization signals which are known to be used in the idle mode cells.

Action 931

The first network node 111 may send a measurement and report configuration for synchronization signal monitoring to the user equipment 130.

According to some embodiments herein, the measurement and report configuration may comprise reporting its synchronization signal coverage of the other network nodes 112,113 periodically, e.g. to identify relations between nodes where one network node, e.g. the first network node 111 has an active mode beam coverage in a location which is within an idle mode cell coverage provided by other network node.

According to some embodiments herein, the measurement and report configuration may comprise reporting its synchronization signal coverage when its synchronization signal coverage of the first network node 111 becomes worse than another synchronization signal coverage more than a certain threshold for a certain time.

According to some embodiments herein, the measurement and report configuration may comprise adding different offsets to different synchronization signal measurements.

Action 932

The user equipment 130 may send an idle or inactive mode synchronization signal measurement report to the first network node 111 indicating detected synchronization signals.

According to some embodiments, when the user equipment 130 detects a synchronization signal different from the list of known synchronization signals, the user equipment 130 may send an idle or inactive mode synchronization signal measurement report to the first network node 111 indicating the detected synchronization signal.

It is actually the overlap of active mode beam and idle cell coverage that is of interest. After the first network node 111 has obtained information on synchronization signals transmitted from the other network nodes, in order to retrieve information on where the active mode beams and idle cell coverage overlaps and be able to establish the active mode beam to idle mode cell relations, the following action may be performed:

According to some embodiments, if the first network node 111 do not recognize the detected SS as the SS of one of its neighbors, optionally an automatic base station relation establishment procedure (ABSR) is initiated, and a relation to the unknown base station is set up as described in the following Actions:

Action 940

The first network node 111 may initiate a network node or base station relation establishment procedure when the detected synchronization signal is not from one of its neighboring network nodes.

Action 942

The first network node 111 may set up a neighbour relation to the unknown network node.

Action 950

The first network node 111 stores information on active mode beam to idle cell relations. The active mode beam is the beam serving the user equipment 130 when a new synchronization signal is detected, and the idle mode cell is the cell with the synchronization signal broadcast area provided by the network node transmitting the detected synchronization signal.

According to some embodiments, the information on active mode beam to idle mode cell relations may comprise some identifier of beams or configurations identifying the beam, which may be a network node or base station internal identifier together with some identifier of the idle mode cell including or giving the possibility to lookup information on how to establish contact, i.e. some address, with the base station or node providing the idle mode cell.

According to some embodiments herein, after Action 930, the first network node 111 may provide transmission gap(s) for the user equipment 130 to measure synchronization signals.

Figure 10:
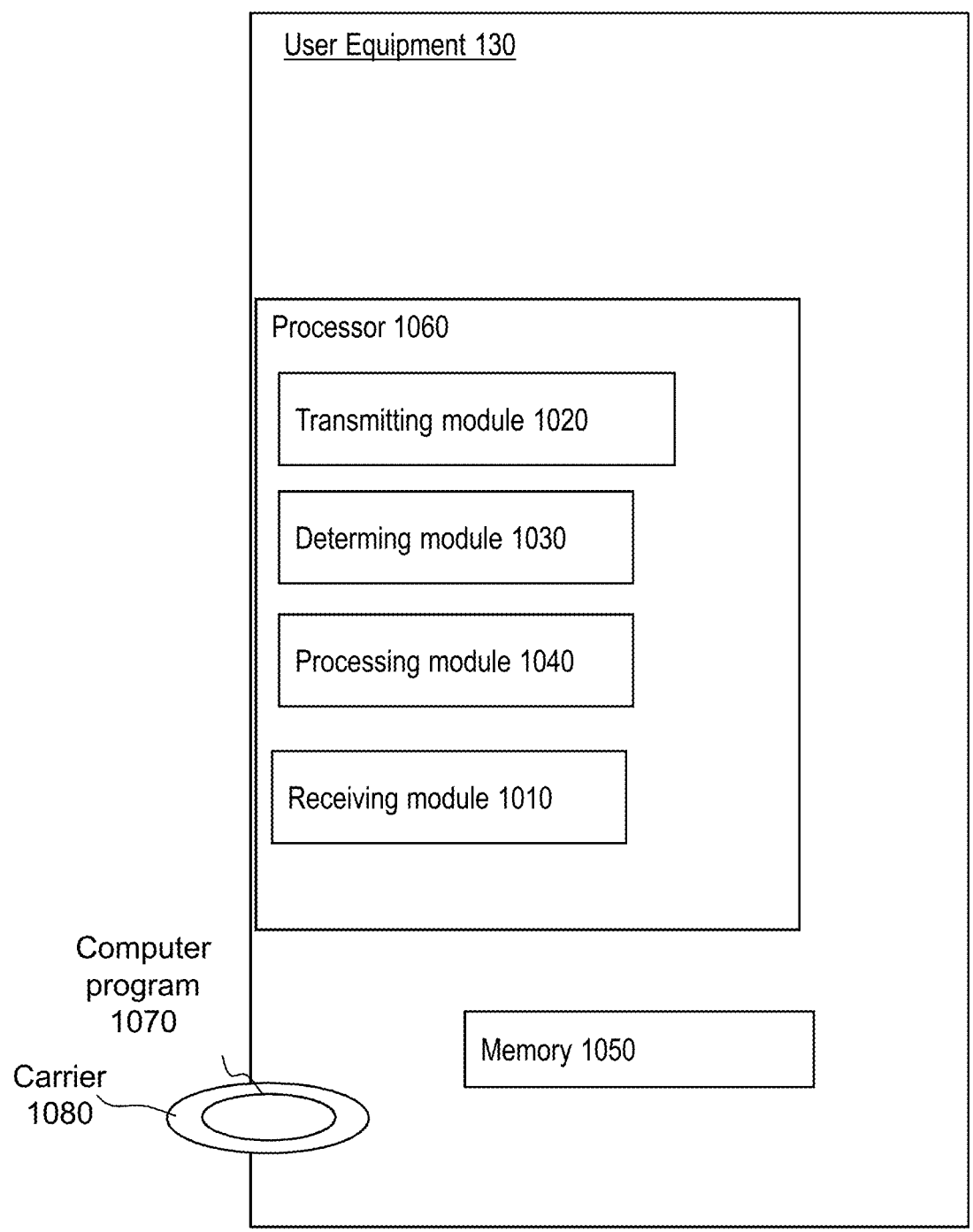
FIG. 10 is a schematic block diagram illustrating a user equipment.

FIG. 10 is a schematic block diagram illustrating a user equipment 130 for assisting establishment of active mode beam to idle mode cells neighbour relations in a wireless communication network 100. A first network node 111 and other network nodes, a second and a third network nodes 112, 113 operate in the wireless communication network 100. The first network node 111 is a serving network node for the user equipment 130 with the active mode beam, and the idle mode cells are cells with respective synchronization signal broadcast areas provided by the other network nodes 112, 113.

The user equipment 130 comprises a receiving module 1010, a transmitting module 1020, a determining module 1030, a processing module 1040, a memory 1050 etc.

The user equipment 130 is configured to, by means of e.g. receiving module 1010 being configured to, receive from the first network node 111 a measurement and report configuration for idle or inactive mode synchronization signal monitoring.

The user equipment 130 is further configured to, by means of e.g. determining module 1030 being configured to, initiate idle or inactive mode synchronization signal monitoring and measurement.

When the measurements meet a report triggering condition, the user equipment 130 is configured to, by means of e.g. transmitting module 1020 being configured to, send an idle or inactive mode synchronization signal measurement report to the first network node 111.

According to some embodiments herein, the user equipment 130 may be further configured to, by means of e.g. transmitting module 1020 being configured to, provide a capability indication of supporting idle or inactive mode synchronization signal monitoring to a network node.

Figure 11:
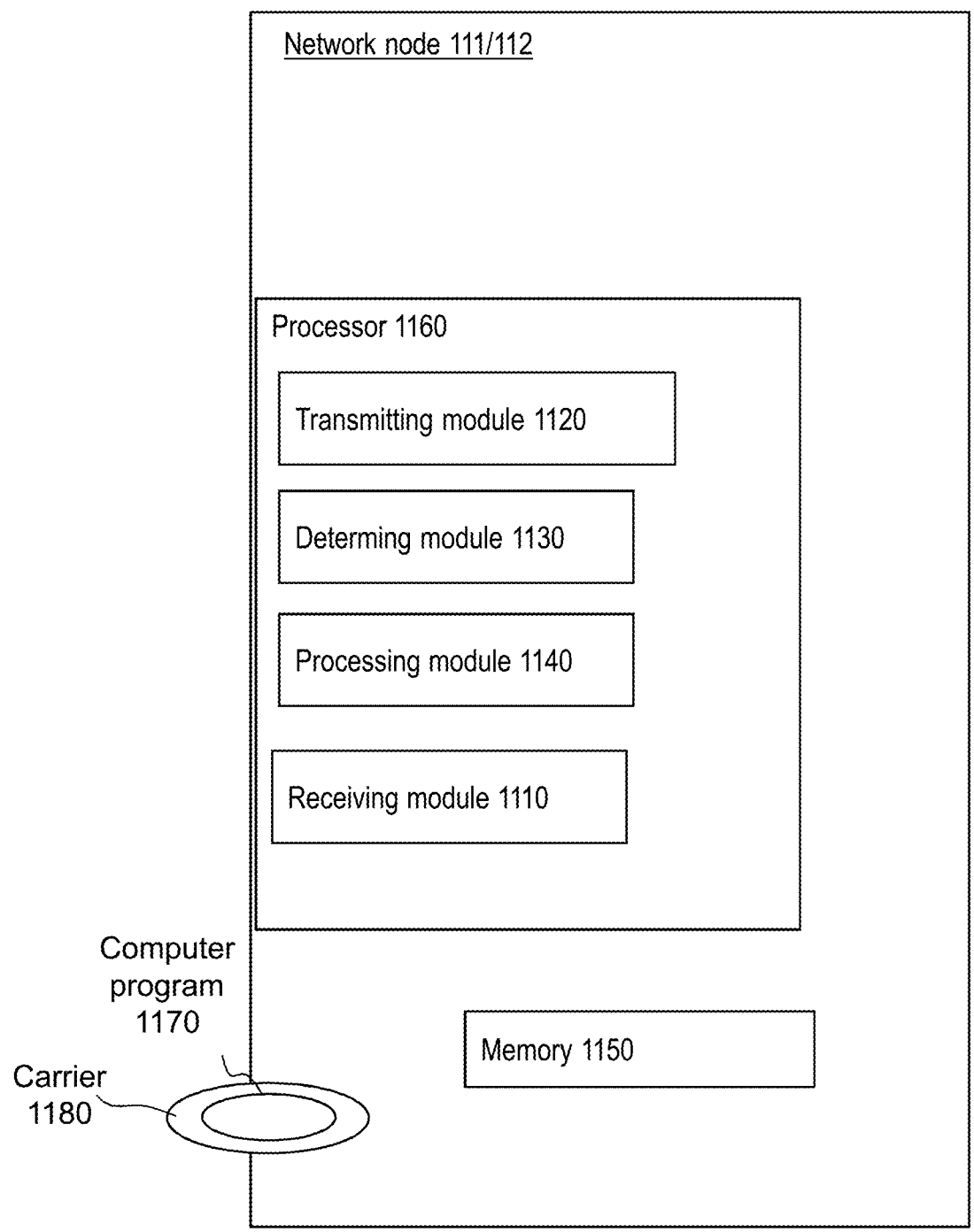
FIG. 11 is a schematic block diagram illustrating a network node.

FIG. 11 is a schematic block diagram illustrating a first network node 111 for assisting establishment of active mode beam to idle mode cells neighbour relations in a wireless communication network 100. A first network node 111 and other network nodes, e.g. a second and a third network nodes 112, 113 operate in the wireless communication network 100. The first network node 111 is a serving network node for the user equipment 130 with the active mode beam, and the idle mode cells are cells with respective synchronization signal broadcast areas provided by the other network nodes (112, 113). The first network node 111 comprises a receiving module 1110, a transmitting module 1120, a determining module 1130, a processing module 1140, a memory 1150 etc.

The first network node 111 is configured to, by means of e.g. transmitting module 1120 being configured to, send a measurement and report configuration for idle or inactive mode synchronization signal monitoring to the user equipment 130.

The first network node 111 is configured to, by means of e.g. receiving module 1110 being configured to, receive an idle or inactive mode synchronization signal measurement report from the user equipment 130.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a Memory Stick, a Multimedia Card (MMC), all may be referred to data carrier 1080, 1180 as shown in FIGS. 10 and 11 etc.

As used herein, the term "computer readable code units" may be text of a computer program, parts of or an entire binary file representing a computer program 1070, 1170 in a compiled format or anything there between, as shown in FIGS. 10, 11.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

The invention claimed is:

1. A method of operation by a User Equipment (UE) comprising:
receiving configuration information from a first radio network node having a respective broadcast coverage area over which the first radio network node broadcasts a synchronization signal and system information; and while being served from the first radio network node via an active-mode beam having a respective beam coverage area that can extend beyond the broadcast coverage area of the first radio network node:

detecting a synchronization signal broadcasted by another radio network node over a respective broadcast coverage area of the other radio network node; and sending a measurement report indicating the detection, according to one or more reporting triggers defined by the configuration information, thereby indicating to the first radio network node that the broadcast coverage area of the other radio network node overlaps the beam coverage area of the active-mode beam;

wherein the one or more reporting triggers comprise one or more reporting qualifiers, and wherein the one or more reporting qualifiers comprise a signal-identity qualifier, such that the UE sends the measurement report only if the detected synchronization signal is not already known to the first radio network node, according to known-signal identities indicated in the configuration information or in other signaling received by the UE from the first radio network node.

2. The method of claim 1, wherein the one or more reporting qualifiers further comprise a signal coverage threshold, such that the UE sends the measurement report only if the detected synchronization signal satisfies the signal coverage threshold.

3. The method of claim 2, wherein the signal coverage threshold is a difference threshold, such that the UE sends the measurement report only if signal coverage at the UE for the detected synchronization signal exceeds signal coverage at the UE for the synchronization signal broadcasted by the first radio network node by more than a certain amount.

4. The method of claim 1, wherein the one or more reporting triggers further comprise a new-signal detection trigger, such that the UE sends a measurement report for any new synchronization signal that is not already known to the first radio network node and is detected by the UE while being served from the first radio network node via the active-mode beam, wherein any synchronization signal transmitted by a radio network node other than the first radio network node is considered to be a new synchronization signal, at least upon its initial detection by the UE.

5. The method of claim 1, wherein the configuration information configures the UE to periodically monitor for synchronization signals from other radio network nodes while being served by the first radio network node via the active-mode beam, wherein detecting the synchronization signal broadcasted by the other radio network node comprises detecting the synchronization signal from the other radio network node during a periodic monitoring interval, and wherein sending the measurement report comprises, subject to the synchronization signal from the other radio network node satisfying the one or more reporting triggers, sending measurement report during the periodic monitoring interval.

6. The method of claim 5, wherein the configuration information or further signaling received from the first radio network node configures measurement gaps with respect to the active-mode beam, for use by the UE in periodically monitoring for synchronization signals from other radio network nodes.

7. The method of claim 1, further comprising sending capability information to the first radio network node, the capability information indicating that the UE has the ability to measure and report on neighboring synchronization signals from neighboring radio network nodes, while being served on the active-mode beam, wherein the UE receives the configuration information in response to sending the capability information.

8. A User Equipment (UE) comprising:

communication circuitry configured to send signals to radio network nodes and receive signals from radio network nodes; and processing circuitry operatively associated with the communication circuitry and configured to:

receive configuration information from a first radio network node having a respective broadcast coverage area over which the first radio network node broadcasts a synchronization signal and system information; and while being served from the first radio network node via an active-mode beam having a respective beam coverage area that can extend beyond the broadcast coverage area of the first radio network node:

detect a synchronization signal broadcasted by another radio network node over a respective broadcast coverage area of the other radio network node; and send a measurement report indicating the detection, according to one or more reporting triggers defined by the configuration information, thereby indicating to the first radio network node that the broadcast coverage area of the other radio network node overlaps the beam coverage area of the active-mode beam;

wherein the one or more reporting triggers comprise one or more reporting qualifiers, and wherein the one or more reporting qualifiers comprise a signal-identity qualifier, such that the processing circuitry sends the measurement report only if the detected synchronization signal is not already known to the first radio network node, according to known-signal identities indicated in the configuration information or in other signaling received by the UE from the first radio network node.

9. The UE of claim 8, wherein the one or more reporting qualifiers further comprise a signal coverage threshold, such that the processing circuitry sends the measurement report only if the detected synchronization signal satisfies the signal coverage threshold.

10. The UE of claim 9, wherein the signal coverage threshold is a difference threshold, such that the processing circuitry sends the measurement report only if signal coverage at the UE for the detected synchronization signal exceeds signal coverage at the UE for the synchronization signal broadcasted by the first radio network node by more than a certain amount.

11. The UE of claim 8, wherein the one or more reporting triggers further comprise a new-signal detection trigger, such that the processing circuitry sends a measurement report for any new synchronization signal that is not already known to the first radio network node and is detected by the UE while being served from the first radio network node via the active-mode beam, wherein any synchronization signal transmitted by a radio network node other than the first radio network node is considered to be a new synchronization signal, at least upon its initial detection by the UE.

12. The UE of claim 8, wherein the configuration information configures the UE to periodically monitor for synchronization signals from other radio network nodes while being served by the first radio network node via the active-mode beam, wherein the processing circuitry is configured to detect the synchronization signal broadcasted by the other radio network node during a periodic monitoring interval, and wherein the processing circuitry is configured to send the measurement report, subject to the synchronization signal from the other radio network node satisfying the one or more reporting triggers, during the periodic monitoring interval.

13. The UE of claim 12, wherein the configuration information or further signaling received from the first radio network node configures measurement gaps with respect to the active-mode beam, for use by the UE in periodically monitoring for synchronization signals from other radio network nodes.

14. The UE of claim 8, wherein the processing circuitry is configured to send capability information to the radio network node, the capability information indicating that the UE has the ability to measure and report on neighboring synchronization signals from neighboring radio network nodes, while being served on the active-mode beam, and wherein the UE receives the configuration information in response to sending the capability information.

15. A method of operation by a radio network node, the method comprising:
broadcasting a synchronization signal and system information over a respective broadcast coverage area associated with the radio network node, for reception by User Equipments (UEs) operating within the broadcast coverage area;
sending configuration information to a User Equipment (UE), the configuration information indicating one or more trigger conditions that control measurement reporting by the UE with respect to synchronization signals from neighboring radio network nodes, as detected by the UE while being served by the radio network node via an active-mode beam;
serving the UE via the active-mode beam, the active-mode beam having a respective beam coverage area that can extend beyond the broadcast coverage area of the radio network node;
receiving a measurement report from the UE while serving the UE via the active-mode beam, indicating detection by the UE of a neighboring synchronization signal;
using information contained in the measurement report to establish neighbor relations with a neighboring radio network node responsible for transmitting the neighboring synchronization signal; and
determining a list of known neighboring synchronization signals, for which corresponding neighbor relations are established as between the radio network node and corresponding ones of neighboring radio network nodes responsible for the known neighboring synchronization signals, and wherein the configuration information indicates the known neighboring synchronization signals, such that, as one of the one or more trigger conditions, the UE does not send measurement reports for the known neighboring synchronization signals.

16. The method of claim 15, further comprising transmitting the configuration information to the UE in response to receiving capability information from the UE, indicating that the UE has the ability to measure and report on neighboring synchronization signals while being served via the active-mode beam.

17. The method of claim 15, further comprising determining the list of known neighboring synchronization signals based on receiving information from the corresponding neighboring radio network nodes, or from a supporting node in a wireless communication network that includes the radio network node, or from the UE, based on the UE detecting and reporting on the known neighboring synchronization signals.

18. The method of claim 15, further comprising sending context information for the UE to the neighboring radio network node responsible for transmitting the neighboring synchronization signal.

19. A radio network node comprising:
communication circuitry configured for broadcasting a synchronization signal and system information over a respective broadcast coverage area associated with the radio network node, for reception by User Equipments (UEs) operating within the broadcast coverage area, and further configured for sending signals to and receiving signals from respective UEs; and
processing circuitry operatively associated with the communication circuitry and configured to:
send configuration information to UE, the configuration information indicating one or more trigger conditions that control measurement reporting by the UE with respect to synchronization signals from neighboring radio network nodes, as detected by the UE while being served by the radio network node via an active-mode beam;
serve the UE via the active-mode beam, the active-mode beam having a respective beam coverage area that can extend beyond the broadcast coverage area of the radio network node;
receive a measurement report from the UE while serving the UE via the active-mode beam, indicating detection by the UE of a neighboring synchronization signal;
use information contained in the measurement report to establish neighbor relations with a neighboring radio network node responsible for transmitting the neighboring synchronization signal; and
determine a list of known neighboring synchronization signals, for which corresponding neighbor relations are established as between the radio network node and corresponding ones of neighboring radio network nodes responsible for the known neighboring synchronization signals, and wherein the configuration information indicates the known neighboring synchronization signals, such that, as one of the one or more trigger conditions, the UE does not send measurement reports for the known neighboring synchronization signals.

20. The radio network node of claim 19, wherein the processing circuitry is further configured to send the configuration information to the UE in response to receiving capability information from the UE, indicating that the UE has the ability to measure and report on neighboring synchronization signals while being served via the active-mode beam.

21. The radio network node of claim 19, wherein the processing circuitry is configured to determine the list of known neighboring synchronization signals based on receiving information from the corresponding neighboring radio network nodes, or from a supporting node in a wireless communication network that includes the radio network node, or from the UE, based on the UE detecting and reporting on the known neighboring synchronization signals.

22. The radio network node of claim 19, wherein the processing circuitry is configured to send context information for the UE to the neighboring radio network node responsible for transmitting the neighboring synchronization signal.

* * * * *